United States Patent [19]

Dahlen et al.

[11] Patent Number: 5,007,285

[45] Date of Patent: Apr. 16, 1991

[54] LOW COST DRIFTER

[75] Inventors: John M. Dahlen, Duxbury; Narender K. Chhabra, Bedford; Richard K. Araujo, Tewksbury; James R. Scholten, Sudbury; Robert W. Reid, Acton; Matti Soikkeli, Braintree, all of Mass.

[73] Assignee: The Charles Stark Draper Laboratory, Cambridge, Mass.

[21] Appl. No.: 325,522

[22] Filed: Mar. 17, 1989

[51] Int. Cl.$^5$ ............................................. G01W 1/00
[52] U.S. Cl. ..................................... 73/170 A; 367/4; 441/1
[58] Field of Search ...................... 73/170 A; 367/3, 4; 441/1, 33

[56] References Cited

U.S. PATENT DOCUMENTS 3,281,765 10/1966 Taplin ..................................... 367/4
3,543,228 11/1970 Farmer et al. .......................... 367/4

FOREIGN PATENT DOCUMENTS 1082526 9/1967 United Kingdom ............. 73/170 A

OTHER PUBLICATIONS

Cheney et al., "Air Deployment of Satellite-Trucked Drifters", J. Geoph. Res., vol. 85, No. C5, May 1980, pp. 2773-2778.
Petersohn et al., "DOPY-a Minimum Motions Drifting Data Buoy", Conf. Oceans '79, San Diego, Ca., 9/79, pp. 245-249.

Primary Examiner—Charles A. Ruehl
Attorney, Agent, or Firm—Weingarten, Schurgin, Gagnebin & Hayes

[57] ABSTRACT

A low-cost floating drifter adapted to accurately follow near-surface ocean currents and transmit periodically to monitoring satellites data and position-determining information. Global tracking of ocean currents is made economically and scientifically feasible by the use of large numbers of such drifters. The drifter includes a floating surface buoy in the approximate shape of an oblate spheroid and containing an electronic system, a slotted plane antenna, transmitter, sunrise and sunset detector, environmental sensors, buoy hull strain sensor and battery power supply. The surface buoy is stabilized and induced to follow ocean currents by a drogue suspended from the bottom center surface. The drogue includes a wire-cored buoyant rope of up to hundreds of meters in length and weighted to a slight negative buoyancy. The drogue may also include an elongated cylindrical sock of substantially greater diameter than the rope. By means of the sunrise and sunset detector and the electronic system, the transmitter is controlled to operate only during selected passes of a solar synchronous satellite so as to conserve the battery and permit unattended life of up to several years. By means of the hull strain sensor and the electronic system the transmitted signal contains data from which the drogue integrity can be determined. Other status and environmental data are also transmitted. The drifter has special provisions to resist corrosion, fish-bite damage and biological fouling.

11 Claims, 14 Drawing Sheets

_Fig 3_

_Fig 3A_

LOW COST DRIFTER

FIELD AND BACKGROUND

A knowledge of ocean currents, their locations and rates, is important for various purposes including meteorology, oceanography, fisheries and navigation among others. One scientifically acceptable and customary method of collecting information used to improve our knowledge of ocean currents involves tracking currents with floating instrumentation, usually called drifters.

The accurate analysis of ocean currents by this method requires a great many drifters tracked over long time periods up to several years. Rapid progress can be made only if this method is economical, which requires low cost drifters having useful lives greater than one year. Long life in turn requires efficient use of energy consuming components such as transmitters, and resistance to damage from waves, fish, vessels, corrosion and biofouling. The drifter must also accurately follow the currents in good and adverse sea states and be adaptable to follow currents at various defined depths. Finally, the instrument package must also be selfrighting in the event it is capsized by waves.

SUMMARY OF THE INVENTION

The present invention contemplates a low cost drifter having a surface buoy and drogue adapted to drift accurately with ocean currents and instrumented to transmit position information with or without status and environmental information to a data receiving satellite. The surface buoy is formed as a solid in the approximate shape of an oblate spheroid containing the instrumentation and provided with sufficient floatation to provide a net buoyancy of about fifteen pounds. The buoy shape and a central mass distribution along with a low tension in the drogue give it good surface following stability in all sea conditions. This stability is critical for good antenna performance and communication reliability. The drogue is an elongated rope that has a wire core. This design will not kink, protects against fish-bite and easily saturates with antifouling protectants. Depending upon the scientific requirements a cylindrical holey nylon sock may be suspended from the rope to enhance the drifter's water mass-following performance.

The instrumentation within the drifter causes it to transmit to orbiting satellites only during a selected fraction of the day, those periods when it is within range of a satellite orbit. Thus the instrumentation limits the transmitter on time to a fraction of the day. In particular, the instrumentation detects sunrise and sunset and finds therefrom the local solar time. ARGOS satellites in near-polar orbits precess so that they cross the equator at known fixed solar times. The instrumentation computer memory contains the solar time periods when the drifter is within range of the satellite orbits. The drifter is also instrumented with sensors to include in the transmitted data certain valuable information: a thermistor for sea surface temperature, a voltage sensor for battery status and a hull-mounted strain gage whose signal is processed to indicate the presence or loss of the drogue.

It is therefor an object of the invention to provide a surface buoy shape and mass distribution with good sea surface-following characteristic for low drag (small drogue slip error) and good antenna performance. The slip or slippage error is the difference between the speed of the buoy and the average speed of the water layer in which the drogue is immersed.

It is a further object to provide a buoy of miniature size so that low wind and water drag is experienced permitting use of a small drogue for acceptable slip error. A small system is economical to build and transport, and more resistant to wave damage since wave forces are proportional to the cube of system dimensions while strength is proportional to the square of dimensions.

It is a further object to provide a miniature buoy nearly invisible to potential vandals and nearly immune to vessel collision damage.

It is a further object to provide a patch antenna of special design to fit within and make practicable the miniature buoy.

It is a further object to provide solar time determination using a sunrise/sunset detector (SSD) and micro computer that permits turning off the transmitter for long periods when position fixes are unattainable or unnecessary permitting use of a small battery and hence a miniature buoy.

It is a further object to provide a rope or rope plus holey sock drogue as a high drag device to lock the system to the water mass occupied by the drogue. These drogue shapes have proven drag characteristics and are well-behaved. They are easy to build to whatever lengths are dictated by the scientific requirements of the water mass layer. They are also easily impregnated with anti-fouling paint.

It is a further object to provide a wire core within polypropylene rope that provides fish-bite resistance. The wire will not buckle and suffer damage when the rope goes slack because it resides within a larger diameter plastic rope. The combination of polypropylene rope and steel wire is slightly and negligibly inclined to sink in seawater. Neutral buoyancy is ideal. The wire is covered by a nylon jacket for corrosion resistance.

It is a further object to provide in the rope to buoy and rope to holey sock drogue attachments a strain-relieving boot. The rope is nominally ⅜ inch diameter. Where it attaches to the surface buoy and the subsurface holey sock, the constant flexing tends to fatigue the polypropylene fibers. At these critical points strain relief is provided by embedding the rope within a larger ¾ inch diameter flexible polypropylene collar which is called the strain-relieving boot. The design used permits very long life, well in excess of one year.

It is a further object to provide a buoy hull capable of flexing and instrumented with a strain gage cemented to the inside bottom of a LEXAN polycarbonate hull. The gage output is oscillatory when surface waves are present (nearly always). The signal is band-pass filtered to eliminate electronic noise and drift due to temperature changes and creep. The RMS level of the filtered signal is digitized and transmitted to the satellite with other data. The RMS level is high when the drogue is attached and low after it has been cut off. This drogue status signal is inexpensively derived and reliable to generate, yet it is essential because the user must know if the surface buoy, which is tracked by the satellite, is following the surface layer or the desired subsurface water layer.

It is a further object to provide all materials in contact with seawater of plastic, coated and/or impregnated with antifouling paint. Thus corrosion and biofouling damage are controlled to the extent that very long life, well in excess of one year, is attained.

It is a further object to provide a thermistor sensor embedded within the lower inside hull extremity where its response time is approximately 10 minutes. A digitized sensor representation is sent to the satellite indicating sea surface temperature (universally desired by scientists) unaffected by wave action transients.

It is a further object to control drogue negative buoyancy with ballast and/or floatation attached at the bottom or top of the drogue to hold the drogue nearly vertical. The longer the drogue and the greater the expected current shear, the greater the ballast required. Tension in the rope under the buoy must be kept between 2 and 5 lbs., however, so that buoy submergence in waves does not become excessive. Net buoyancy of the surface buoy is about 15 lbs. Reserve buoyancy after considering rope tension is thus about 10–13 lbs., an amount found satisfactory by experience. Thus any ballast weight in excess of 5 lbs. must be balanced by a subsurface float placed near the midpoint of the rope.

It is a further object to improve upon the accuracy formerly attained by drifters in various sea states and current shears. The error is the speed of the drogue with respect to the water mass in which it is immersed. This "slip error" has been shown by experiment to be very small, usually under 2 cm/sec. This good performance results from the unique configuration and the dimensions and parameters chosen.

It is a further object to provide a configuration which can be accurately modeled by computer simultations which predict slip error and buoy submergence in given sea states and current variations over the drifter length. The accuracy of the drifter has been determined by careful calibration tests to measure the slip of the drogue through the water mass to which it is presumed locked.

BRIEF DESCRIPTION OF THE DRAWINGS

These and other features of the present invention are more fully described in the following solely exemplary detailed description and accompanying drawing in which:

FIGS. 3C–3G are circuit and layout diagrams of the system electronics;

FIG. 5 is a sectional view from above the surface buoy.

DETAILED DESCRIPTION OF THE INVENTION

The present invention contemplates a long lived drifter for following ocean currents and transmitting to orbiting satellites position defining information and other data at near-optimal satellite transit times while keeping on station in the ocean current and maintaining seaworthiness in adverse conditions.

Figure 1:
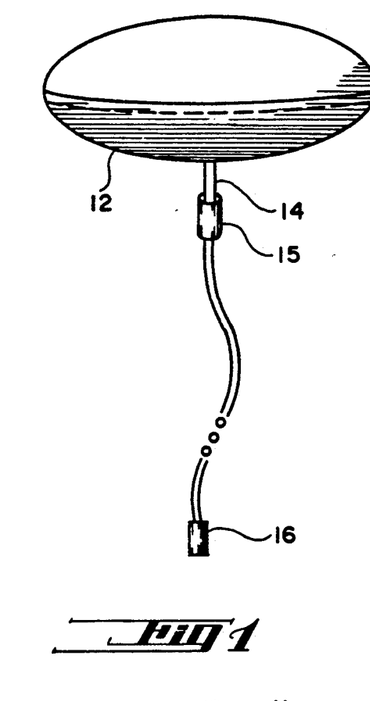
FIG. 1 is a pictorial view of a first embodiment of the present invention in which the drogue is simply a rope.
Figure 1A:
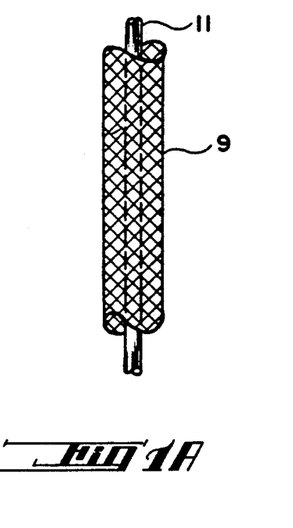
FIG. 1A is a diagram of a typical drogue rope.

A drifter according to the present invention is shown in FIGS. 1 and 1A wherein a surface buoy 12 is shaped in the approximate form of an oblate spheroid. The shape of the buoy 12 is detailed in FIG. 4 and is generally of a diameter slightly over 14 inches and an aspect ratio of about 0.5 for the height to diameter ratio. Attached to the bottom of the buoy 12 is a rope 14 further resolved in FIG. 1A. The rope is typically formed of plaited, positive buoyancy polypropylene rope 9 with or without a central plastic-jacketed wire rope core 11 to provide fish-bite resistance. The tension in the rope 14 just under the buoy should be between 2 and 5 lbs. obtained by the wire core and/or by a ballast 16 at the rope end and/or an upper float 15. The length of the rope can be up to hundreds of meters although less than 100 meters is typical depending upon scientific requirements. The rope drogue causes the drifter to follow the mean transport velocity of the water layer from the surface to the bottom end of the rope. The rope diameter may be chosen between ¼ and ¾ inch. The larger the diameter the more accurately the drifter tracks the desired water layer, but the greater the shipping weight, cost and buoy submergence in waves. Ballast and rope diameter are best chosen after studies using a computer simulation or experimentation in the real application. The buoy 12 is typically formed by a two piece LEXAN polycarbonate plastic hull. After loading the buoy with instrumentation and battery a net buoyancy of about 15 pounds results.

Figure 2:
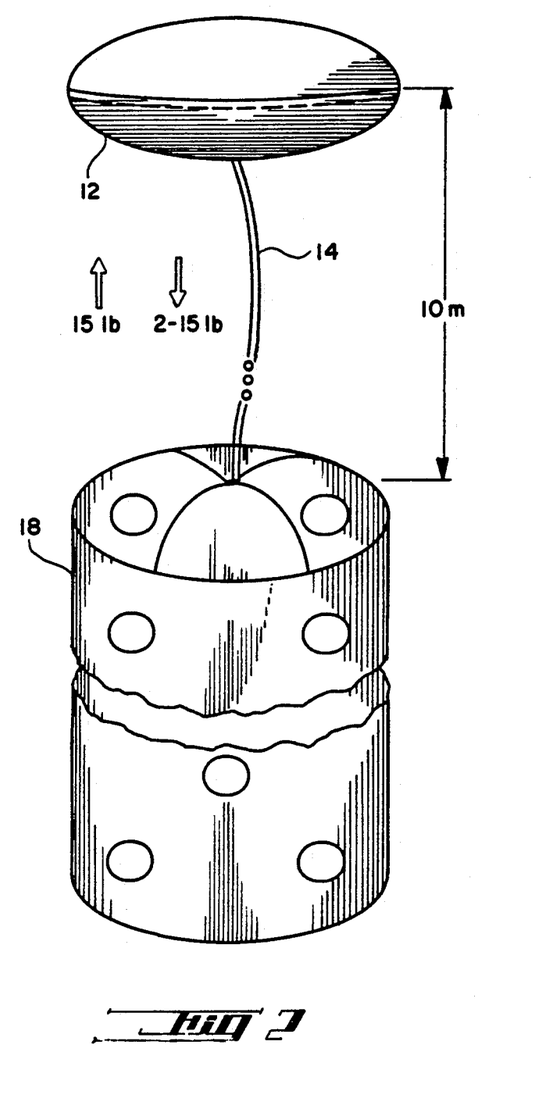
FIG. 2 is a pictorial view of a second embodiment of the present invention in which the drogue is a rope plus holey sock.
Figure 2A:
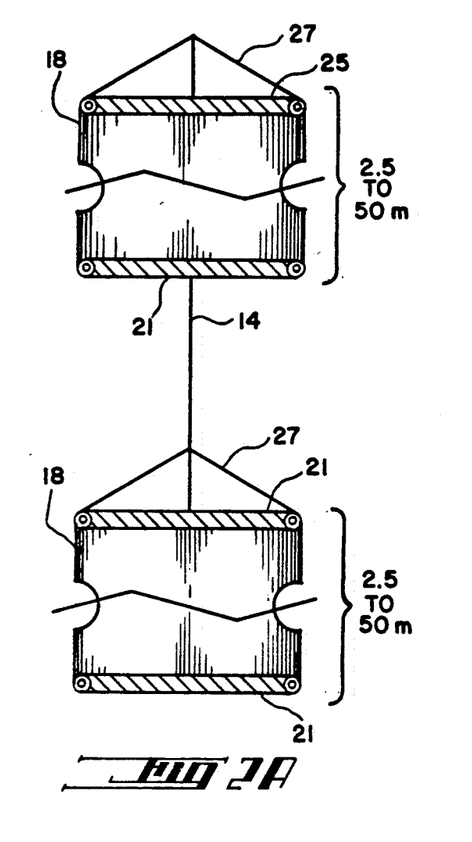
FIGS. 2A and 2B are diagrams of a typical holey sock.
Figure 2B:
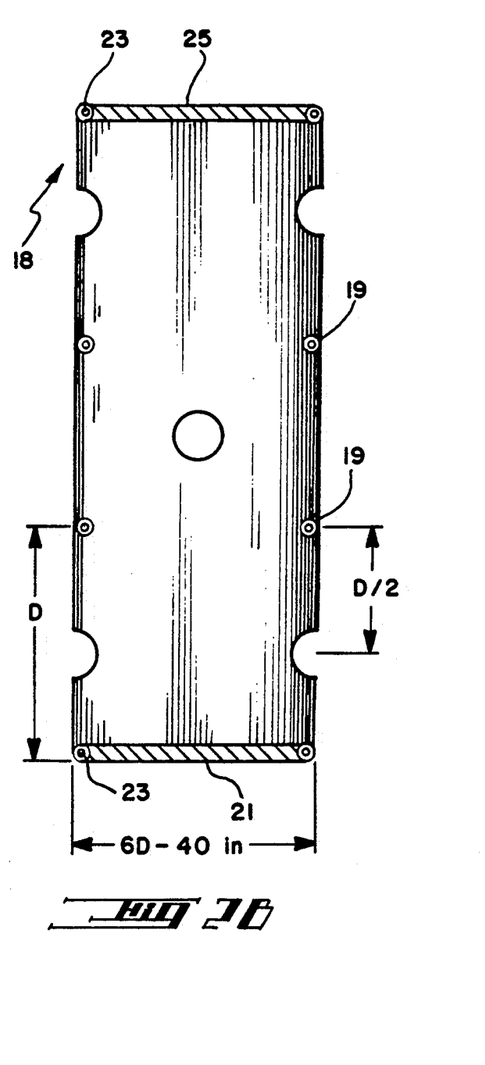

FIGS. 2, 2A, and 2B, show an alternative drogue configuration for tracking subsurface layers in which the rope 14 terminates in one or more holey socks 18 made in cylindrical form using CORDURA nylon. Circular polypropylene stiffening rings 19 are slipped into nylon pockets 23 formed inside the sock The holes prevent vortex-induced oscillations. Diameters between six and twenty-four inches have been used successfully but 16 inches is optimum for packaging purposes. Steel ballast rings 21 are inserted in the pockets 23 at and near the bottom of the drogue. A strong polypropylene ring 25 is inserted in the top pocket where a bridle 27 is tied. The length of the sock is chosen so the sock will occupy the subsurface water layer to be tracked. Total lengths between 2.5 and 50.0 meters obtained by connection of 2.5 meter modules have been used successfully. Length and ballast are best chosen after studies using a computer simulation or experimentation in the real application.

Figure 2C:
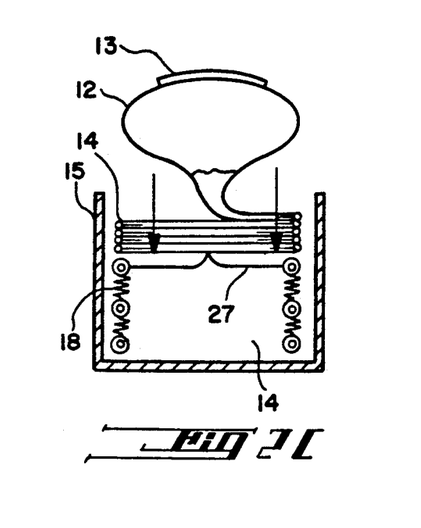
FIG. 2C is an illustration of drifter stacking for deployment.

The buoy 12, rope 14 and sock 18 are conveniently packaged into a box or barrel 15 of size slightly larger than the diameter of the sock or float whichever is larger. The socks 18 conveniently accordion fold into the box or barrel with the rope 14 coiled under the buoy. The buoy 12 nests on top of the rope and sock assembly within the confines of box or barrel 15. This arrangement permits multiple drifters to be taken to sea by boat or aircraft in minimal space and easily deployed by letting the rope and sock pay out behind the buoy. The system can be additionally fully automated by, as explained below, using a dissolvable screen 13 over the buoy 12 in locations where a solar cell is placed to sense local noon and therefore control activation of the electronics within. This permits the system to be stored for some time out of the water without battery utilization and provides activation of the electronics shortly after the drifter is deployed.

Figure 3:
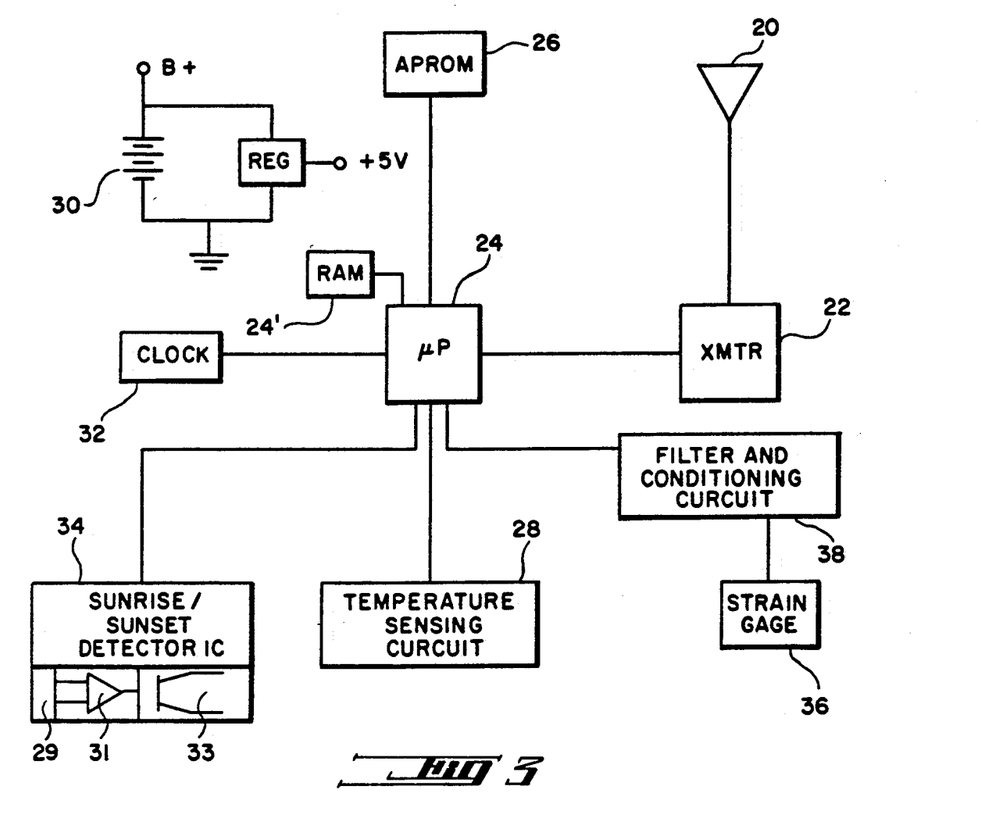
FIG. 3 is a block diagram of internal electronic instrumentation within the surface buoy of the present invention.

Within the hull of the buoy 12 is a set of instrumentation shown in FIG. 3 which controls transmission of radio frequency signals to orbiting satellites which in turn are capable of determining the buoy position and relaying that and other buoy transmitted data to ground stations. Transmission is effected from an antenna 20, typically a slotted square antenna as described below, and initiated from a transmitter 22. Transmitter 22 is typically a TOYOCOM Model T-2023 or other type transmitter selected for optimal transmitted information per power utilization. The transmitter is activated and its modulator controlled by a microprocessor 24 having processing instructions in an EPROM 26. The transmitted data includes drifter identification, the output of a temperature measuring circuit 28 and the output of a strain gage 36 as filtered and conditioned by a circuit 38 that removes unwanted components.

The entire instrument package is run from a portable battery 30. System timing is established by a clock 32. The control over the time of transmission by the transmitter 22 is important if the battery is to have a life of several years in service without replacement or other attention. The orbiting satellites are over the drifter for only portions of the day meaning that transmissions to the satellites will be useful only during those times.

Figure 3A:
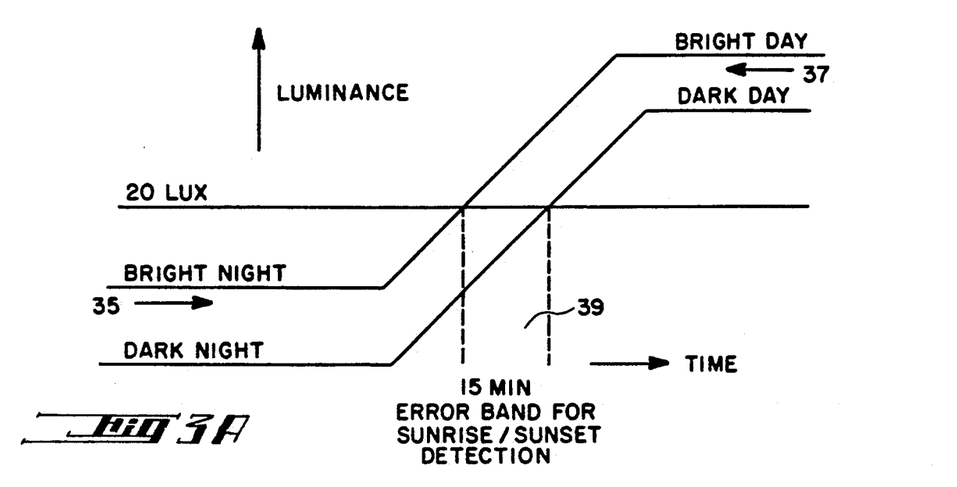
FIGS. 3A and 3B illustrate the determination of local solar time.
Figure 4:
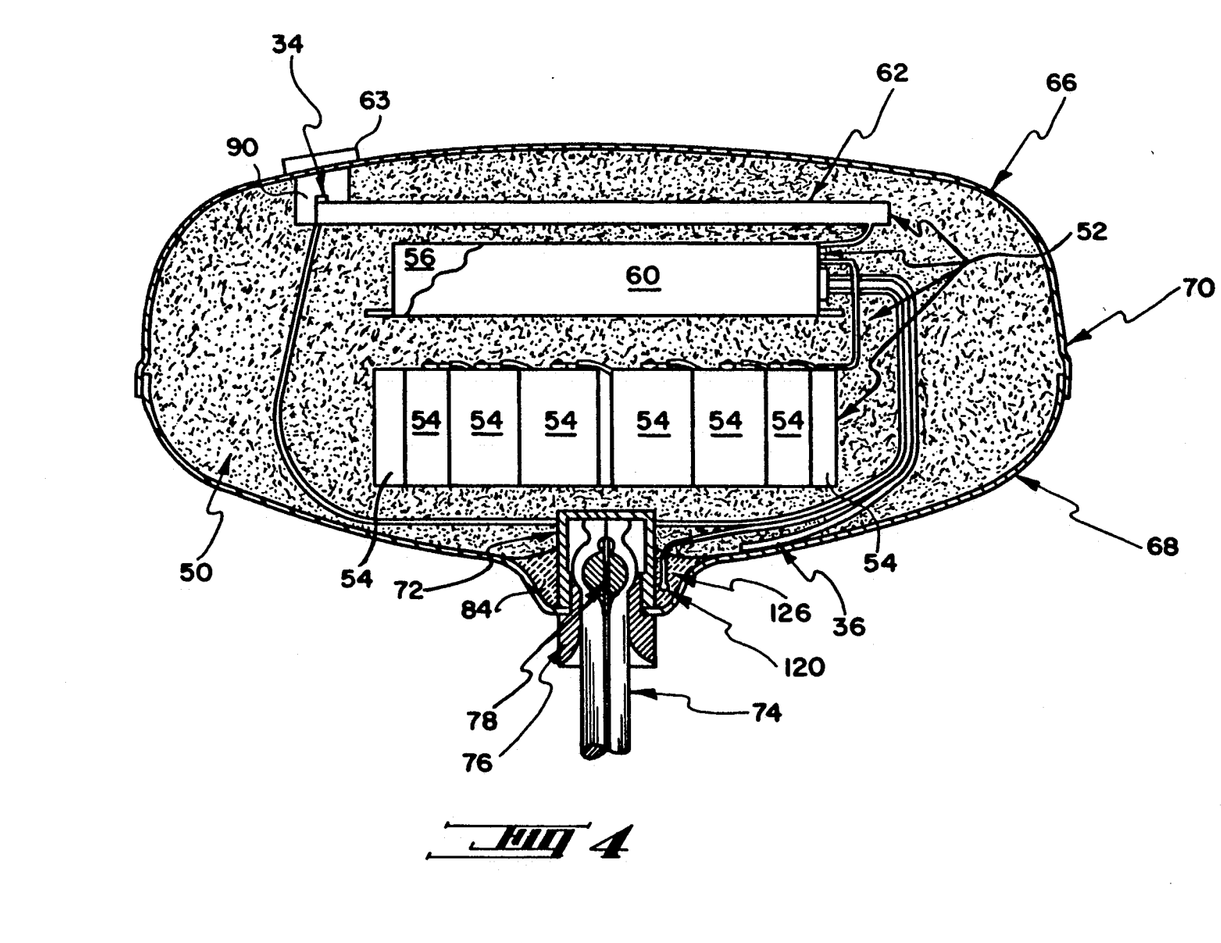
FIG. 4 is a sectional elevation of the surface buoy of the drifter according to the present invention.

Two ARGOS satellites are utilized for drifter tracking. Their orbits are nearly polar, inclined slightly so that they precess slowly to maintain a predetermined longitudinal displacement from the sun's position at all times. Thus due to earth's rotation the drifter will pass under a satellite orbit at four local solar times each day. These times are known in advance and, except at high latitudes, vary only slightly with latitude. For most latitudes the drifter is within range of the orbit for about 1½ to 2 hours before and after it passes under the orbit. Depending upon how many fixes are required the transmitter is turned on for a subset of these 3 to 4 hour periods centered at the solar time of orbit passage. To determine the time at which the transmitter may be activated, considering that the drifter may in its life travel through many time zones, requires a source of local solar time and on board storage of the solar time periods when the drifter is within range of the orbits. The former is achieved with the use of a sunrise/sunset detector and calculating the mid point between the sunrise and sunset times as the local solar noon time. For this purpose an inexpensive, off-the-shelf IC 34 is used. This IC contains a photodiode 29, comparator amplifier 31 and open-collector transistor 33 whose output level shifts when the luminance transits about 20 Lux as shown in FIG. 3A. The transition from night to day zones 35 and 37 will pass through a separate and distinct luminance zone 39 of around 20 Lux regardless of weather and season. The difference between detected and actual local sunrise or sunset is less than 15 minutes, an error of little significance. The IC 34 is located just under the transparent top surface of the buoy 12 as shown in FIG. 4.

Figure 3B:
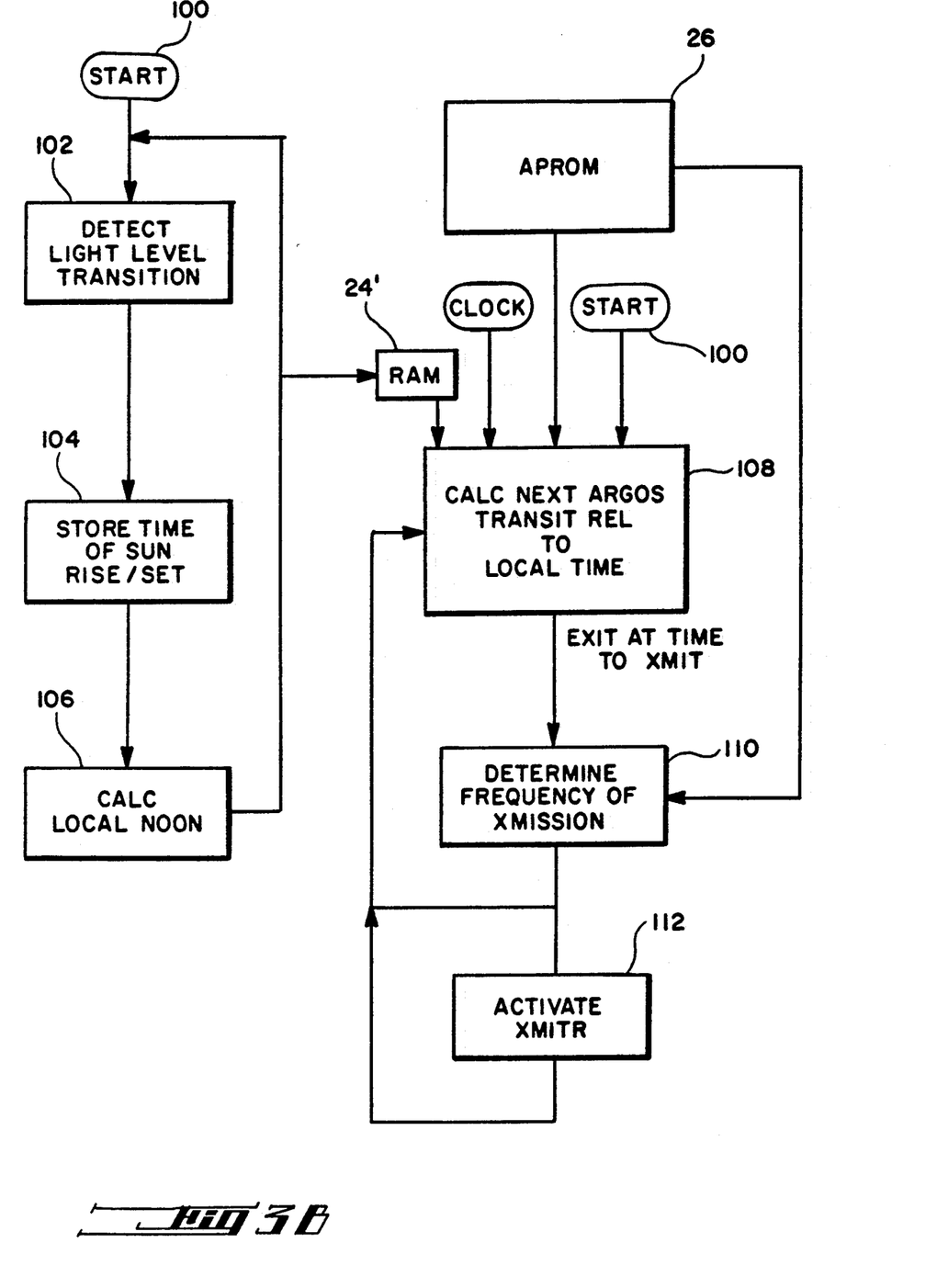

FIG. 3B illustrates the operation of the microprocessor 24 under EPROM 26 control to provide the activation timing for the transmitter 22. From a start state 100 a subsequent step 102 detects the light change and the sense of change corresponding to transition of the 20 Lux level illustrated in FIG. 3A. The time of this transition, along with the sense of the transition, whether from light to dark or dark to light, is stored by the microprocessor 24 in a ram 24' associated with the microprocessor 24 in a step 104. In a subsequent step 106 the time of local noon based upon the most recent sunrise/sunset data is calculated. In typical fashion local noon time is determined as midway between detected sunrise and sunset times using the photo sensor 29. This establishes a local solar time base which is within 15 minutes of local solar time. Step 106 loops with 102.

In a step 108 activated from start 100 this data and the data from EPROM 26 indicating the ARGOS satellites effective orbital data is used to determine, in local time, the 3 to 4 hour transmit intervals when the ARGOS satellite may be visible. In a subsequent step 110 a frequency of transmission determination is made, again from data preprogrammed into the EPROM 26 to determine whether that ARGOS satellite interval is one in which transmission is scheduled. Typically each drifter will be programmed to operate for a period of time transmitting every opportunity followed by another period of time in which the data transmission is at only a fraction of the available opportunities. After the determination 110 is made, processing returns to step 108 either directly, or, through a step 112 in which the transmitter 22 is activated. The transmitter sends a CW wave from which the satellite finds the doppler shift necessary for drifter position calculation. The transmitter also modulates the carrier to telemeter information from the temperature sensing circuit 28, the strain gage 36, as well as drifter identification information stored in memory 26. Additionally, the environmental data may be stored in RAM 24' over a specified interval of time at selected samplings and this information also transmitted during the transmit time. After the transmit state 112 is exited, typically a period of 3 to 4 hours to insure optimal probability of ARGOS reception, processing returns to the state 108. Optionally start steps 100 may have an initialization standby state, exited only when the photocell has received a few hours of daylight. This, in conjunction with water soluble tape 13, permits automatic activation of the drifter even after long periods of storage.

While other schemes may be used to determine the time of transmitter activation, the local solar time control approach is effective and efficient. If the program detects failure of the sunrise/sunset detector 34 it directs a fixed schedule of transmitter operation. At very high latitudes it would often be impossible to detect sunrise or sunset with the sensor described above. However at these high latitudes the drifter is nearly constantly within range of an ARGOS satellite orbit so that transmitter operation can be controlled by any algorithm without regard to solar time.

The buoy 12 of the drifter is shown in more detail in FIG. 4 where the hull is shown to be largely filled with shock-absorbing foam 50. Pockets 52 are formed in the foam to contain the components of the on-board instrumentation. Included in one pocket is a battery made up of 20 or 22 cells 54 in series-parallel combination, packed as closely as possible to the buoy center in order to minimize buoy moments of inertia and thus enhance the buoy's sea surface-following stability. The battery cells may be selected from commercially available alkaline or lithium cells with a view to the number of months of useful life and the number of position fixing transmissions per day desired. Using 20 or 22 D cells (depending upon transmitter voltage requirement) up to several years of drifter operation without the complexity of solar charging is possible.

Also a transmitter 56 is fitted into another foam pocket. The transmitter may be any commercially available ARGOS satellite transmitter which fits. The TOYOCOM Model T-2023 is shown. The non-transmitter portions of the circuitry are placed in a pocket on a circuit board 60. The antenna 62 is placed in the upper most pocket to keep it as high as possible above the sea surface. A dissolving cover 63 is placed over the top, deactivating the sunrise/sunset detector until the buoy is deployed.

Figure 3C:
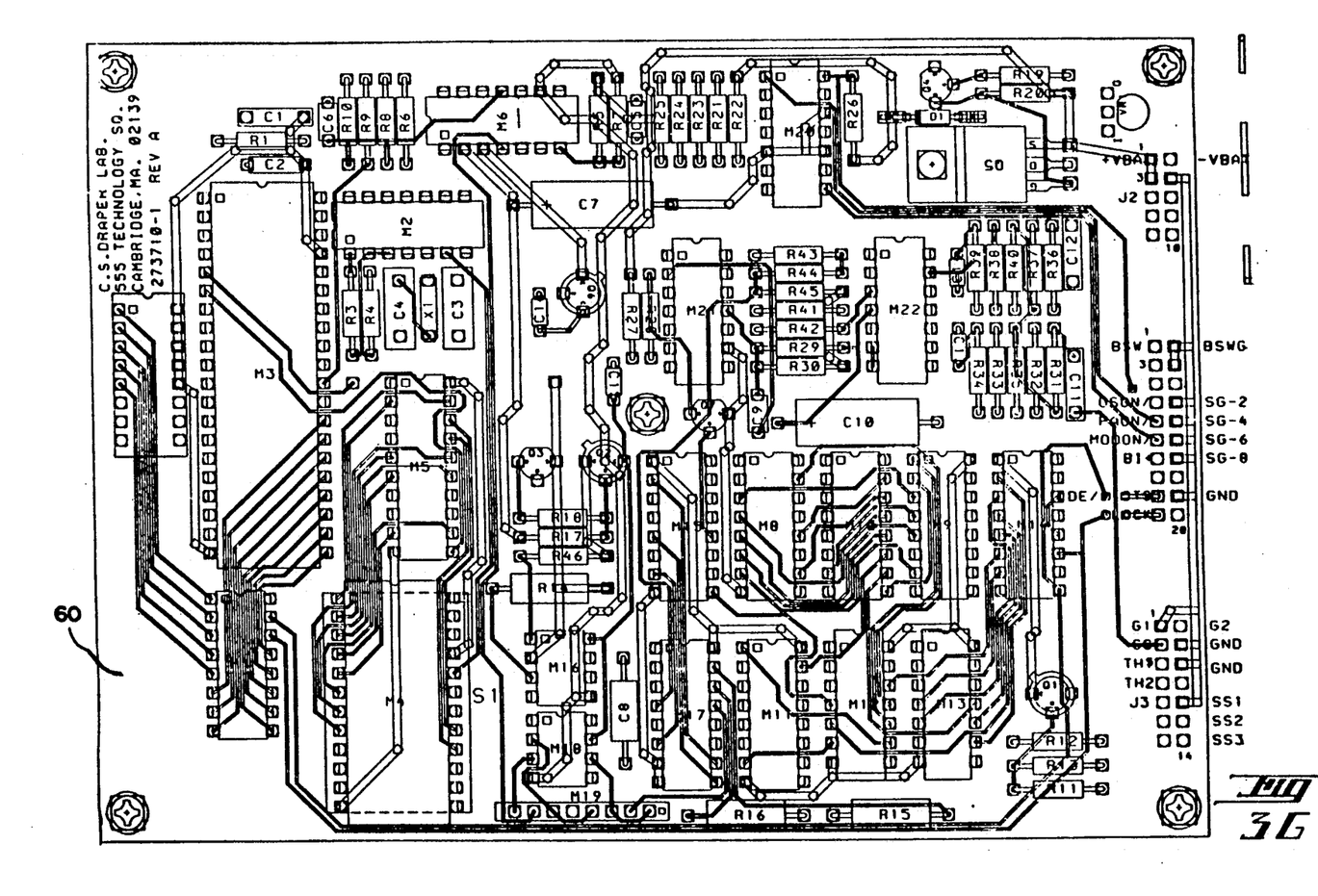

FIG. 3C illustrates the circuitry for providing sunrise and sunset detection via chip 34 and additionally includes the microprocessor 24 circuitry and associated clock 32 and memory 26.

Figure 3D:
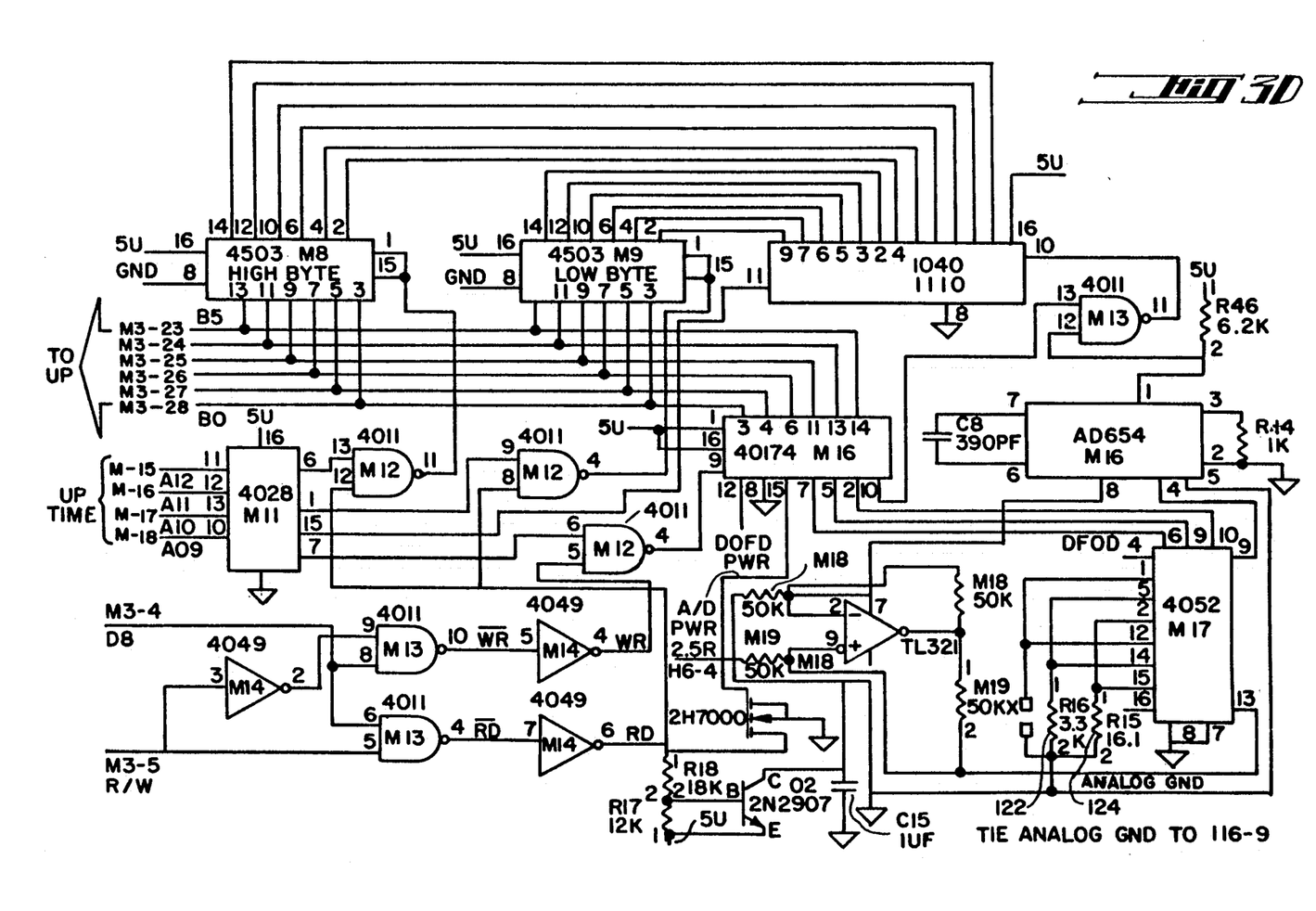

The temperature sensing circuitry 28 and A/D circuitry is illustrated in FIG. 3D. As shown there a thermistor 120, along with reference high and low value resistors 122 and 124 are alternatively sampled for transmission by a multiplexer controlled by timing of the microprocessor and in turn the digital representations are applied back to the microprocessor of FIG. 3C. The thermistor 120 is provided with 0.1 degree centigrade precision and the circuitry is calibrated by including alternate data representations from the precision resistors 122 and 124 which respectively have ohmic values representing the anticipated high and low or nearly high and low limits of the thermistor 120 to permit accurate calibration of the transmitted data.

The thermistor 120 is mounted to the hull, as illustrated in FIG. 4, at a low location so as to be immersed in the seawater environment as far as possible and mounted in a pool of hull adhesive 126 which protects the thermistor and imparts a thermal time constant of about 10 minutes to the thermal response of the thermistor 120. In this manner short term variations due to sea motion are eliminated from the sensitivity of the temperature measuring circuitry.

Figure 3E:
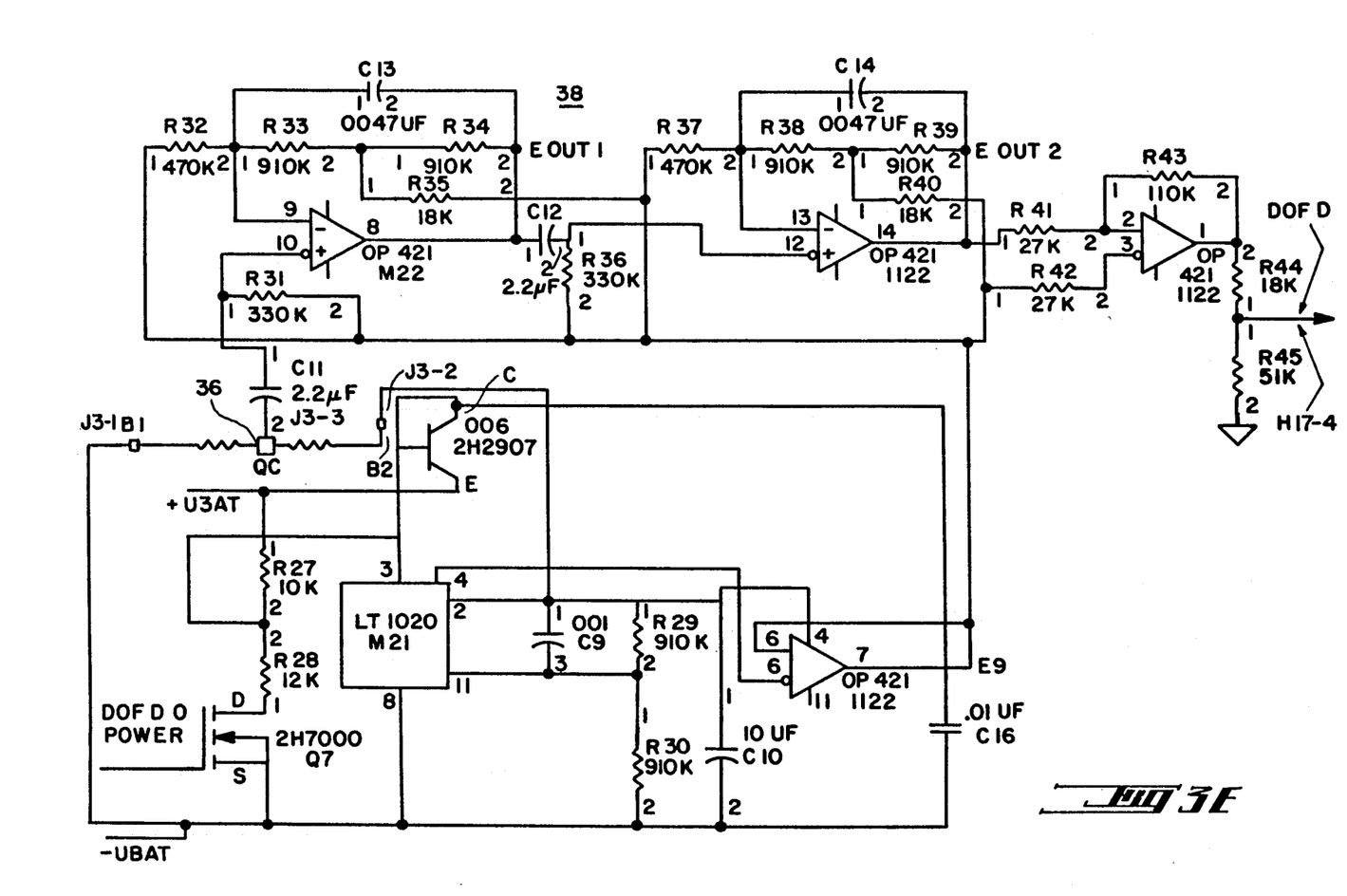

The strain gage 36 circuitry is illustrated in FIG. 3E. As shown there a strain gage 36 has its output representation of hull flexure filtered through a band pass filter 38 to avoid drift and electronic noise that may occur in the output. The standard deviation of its output as filtered is calculated by the microprocessor.

As shown in FIG. 4, the strain gage 36 is attached to a lower inside portion of the hull of buoy 12 where the greatest strain fluctuations occur. The hull, in a LEXAN design, has a thickness of typically ⅛ inch to impart appropriate flexibility to the hull so that the varying load produced by the drogue attached by rope 14 can be accurately sensed. It is important to be able to sense actual oscillations corresponding to sea state while filtering out the drift, creep and electronic noise effects. The band pass selected peaks at 0.2 Hz. Filter output is a weak function of sea state and a strong function of drogue presence.

Figure 3F:
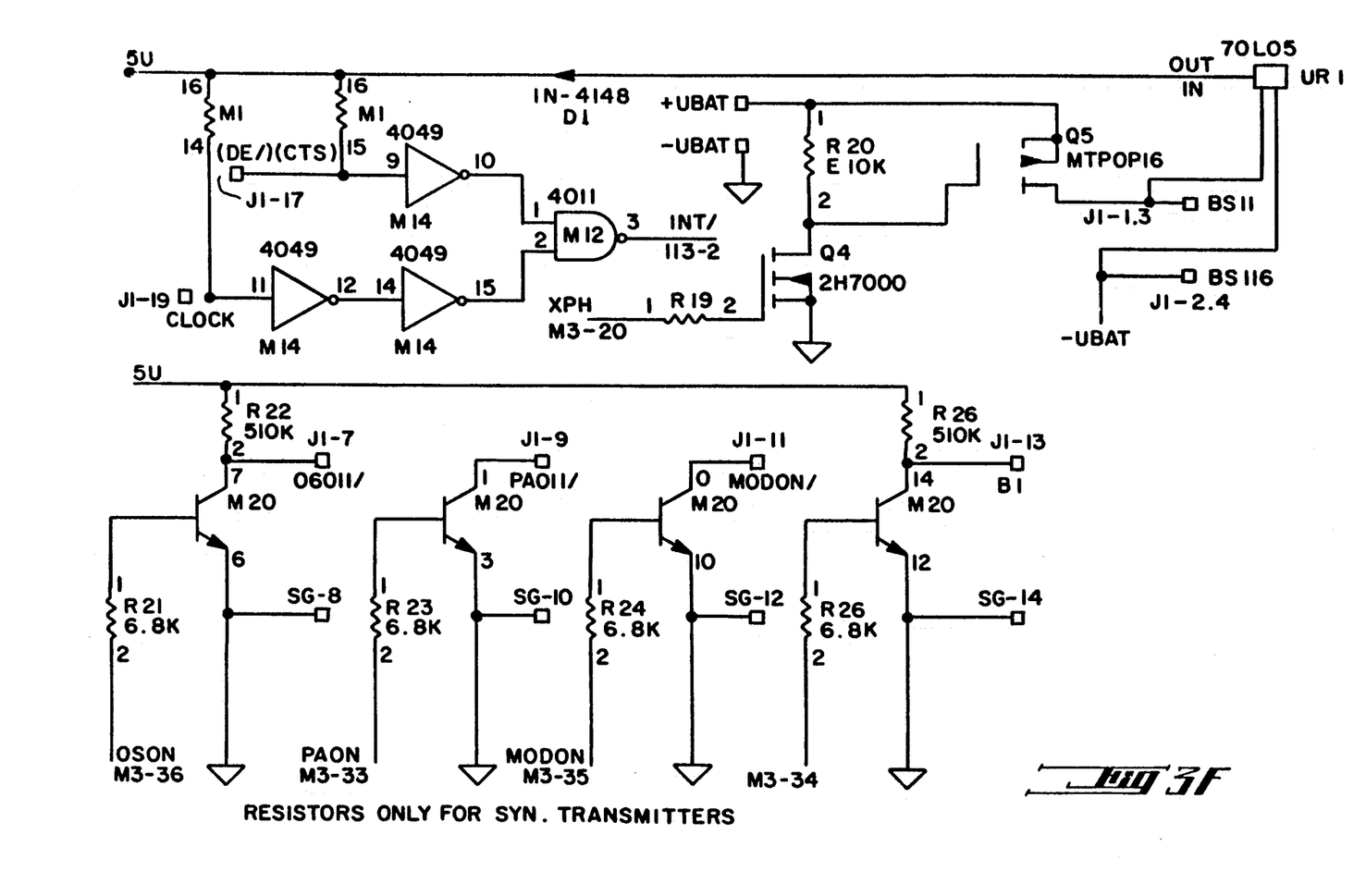

FIG. 3F illustrates the interface between the microprocessor 24 illustrated in FIG. 3C and the transmitter 22.

Finally, FIG. 3G illustrates the circuit board configuration for the components of FIGS. 3C through 3F.

Typically and as shown in FIG. 4, the hull 12 is formed of upper and lower halves 66 and 68 which are cemented together at a seam 70. Below the hull 12 is shown one embodiment of a rope 74 attachment. A female receptacle 72 is cemented into a lower buoy recess 84 using the hull adhesive 126. The rope end contains a ball 78 which is captured in male receptacle 76, which is in turn screwed and cemented into female receptacle 72. At the termination the rope 74 is ¾ inch in diameter for long flex life. If a smaller diameter is desired for most of the rope length, the smaller diameter rope is simply passed through the core of a short length of ¾ inch rope at the attachment. The short ¾ inch rope functions as a strain-relieving boot. In this case the ball is inside the small diameter rope. This form of fastening promotes a secure termination without excessive bending in the rope. A similar termination is used at the bottom of the rope where it joins the sock drogue bridle 27 or a ballast weight.

The antenna 62 of the system is shown more clearly in the top sectional view of FIG. 5. The antenna 62 is typically a slotted square in which a metalized square 58 over a circuit board 94 is fed from the transmitter in the center of one edge via a tab 80. A central slot 92 is provided of length and angle appropriate to the transmission frequency and for right hand circular polarization. The buoy, nearly awash, still transmits accurately.

The photodetector 29 and IC is mounted on top of the circuit board 94. A small circular area 90 of the top of the buoy is not painted with antifouling paint so that sunlight can pass through the clear LEXAN to the photocell 29. The remainder of the hull, rope, sock, etc. is painted/impregnated with anti fouling compositions.

The above described drifting buoy system provides a low cost but long life ocean drifter adapted to permit buoy position to accurately follow ocean currents and to secure determination at regular intervals of buoy position and data for oceanographic studies over protracted periods. Other embodiments are intended to be covered within the scope of the invention which is defined only in the following claims.

What is claimed is:

1. An economical drifter for following ocean currents comprising:
   a buoy that includes a buoy hull of miniataure size, and data transmitting means disposed therein to take local measurement data and transmit said data to a communications satelite over a period of many years at sea; and
   a drogue suspended from said bouy to provide a net slippage error of less than two centimeters per second when said drouge is immersed in an ocean current.

2. The drifter of claim 1 wherein said buoy hull is of oblate spheroid shape for residing at the ocean surface where it may be tracked by various means; and
   said drogue is attached under the buoy, being in the form of a drouge rope or one or more holey socks, or any combination of drouge ropes and holey socks.

3. The drifter of claim 1 or 2 wherein said buoy has:
   a freeboard under 4 inches;
   a weight under 15 pounds and a net buoyancy over 14 pounds, such weight and buoyancy being distributed such that communication with said satellite is reliable even when the buoy is awash in heavy seas.

4. The drifter of claim 2 wherein said drogue rope comprises:
   a wire rope core;
   a surrounding polymer rope having a net buoyancy;
   a ballast weight at the bottom; and
   a subsurface float near the top.

5. The drifter of claim 4 wherein said drogue rope has a net weight at the point of attachment under said buoy of approximately 2 to 5 lbs, the ballast weight, subsurface float and rope diameters and length being chosen to optimize performance.

6. The drifter of claim 2 wherein said holey socks each comprise:
   a nylon cylinder of from 6 to 40 inches in diameter and of any length required to occupy the water layer to be tracked;
   ballast rings at or near the bottom;
   a float above the top.

7. The drifter of claim 6 wherein said nylon cylinder further includes a plurality of axially spaced plastic battens which maintain a cylindrical shape to said holey sock.

8. The drifter of claim 2 wherein the combination of drouge ropes and holey socks has a net weight at the point of attachment under said buoy of approximately 2 to 5 pounds; and
   the ballast rings, floats, diameters and lengths are chosen to optimize performance.

9. The drifter of claim 1 wherein said data transmitting means contains an internal transmitter and antenna for communication with a sun-synchronous ARGOS satellite and a means for controlling the transmitter so that it does not operate when the satellite orbit is below the horizon, thereby preventing waste of electrical energy;
   said means including a sensor at a surface of said buoy to detect transition through a luminance level universally transited during sunrise and sunset conditions;
   said controlling means including means for computing local solar time in response to said detection of sunrise and sunset;
   means for providing storage of local solar time periods when the satellite orbit is above the horizon for determining opportunities for transmission from said transmitter to said satellite.

10. The drifter of claim 1 wherein said transmitting means includes as means for providing local measurement data:
    a strain gage;
    means for afixing said strain gage to said buoy at a location of said buoy hull substantially near a bottom portion thereof, where the thickness and position provide optimal flexing in response to drogue generated forces occurring from sea state conditions; and
    means for providing a signal from said strain gauge representative of strains due to sea state motion of said drifter and which signal changes dramatically if said drogue is separated from said buoy for any reason.

11. The drifter of claim 1 wherein said transmitting means includes as means for providing local measurement data:
    a precision thermistor affixed within said buoy in a location at a bottom portion thereof having a thermal time constant with respect to surrounding sea water of at least several minutes of time;
    plural precision calibrating resistances; and
    means for successively sampling said thermistor and said calibrating resistances to provide sea surface temperature data from which thermistor measuring circuit parameter variations can be compensated for so that the overall accuracy of the measurement will be limited only by the thermistor calibration.

* * * * *